United States Patent
Mandel et al.

(10) Patent No.: US 10,017,244 B2
(45) Date of Patent: Jul. 10, 2018

(54) METHOD OF FABRICATING A FORCE TRANSFER PART HAVING A LUG MADE OF COMPOSITE MATERIAL, AND A PART OBTAINED BY SUCH A METHOD

(71) Applicant: SAFRAN, Paris (FR)

(72) Inventors: Robin Mandel, Paris (FR); Patrick Dunleavy, Palaiseau (FR); Mathieu Renaud, Maisons-Alfort (FR)

(73) Assignee: SAFRAN, Paris (FR)

( * ) Notice: Subject to any disclaimer, the term of this patent is extended or adjusted under 35 U.S.C. 154(b) by 95 days.

(21) Appl. No.: 14/921,181

(22) Filed: Oct. 23, 2015

(65) Prior Publication Data

US 2016/0114884 A1 Apr. 28, 2016

(30) Foreign Application Priority Data

Oct. 24, 2014 (FR) ...................... 14 60250

(51) Int. Cl.
*B64C 25/10* (2006.01)
*B29C 65/00* (2006.01)
(Continued)

(52) U.S. Cl.
CPC .......... *B64C 25/10* (2013.01); *B29C 66/0222* (2013.01); *B29C 66/02241* (2013.01); *B29C 66/304* (2013.01); *B29C 66/729* (2013.01); *B29C 66/72143* (2013.01); *B29C 70/081* (2013.01); *B29C 70/48* (2013.01); *B29C 70/86* (2013.01); *F16C 7/026* (2013.01); *F16H 21/10* (2013.01); *B29K 2063/00* (2013.01); *B29K 2105/12* (2013.01); *B29K 2307/04* (2013.01);
(Continued)

(58) Field of Classification Search
CPC ....... B64C 25/10; F16C 7/026; B29C 70/081; B29C 70/86; B29C 70/48; B29C 66/0222; B29C 66/02241; B29C 66/304; B29C 66/729; F16H 21/10
See application file for complete search history.

(56) References Cited

U.S. PATENT DOCUMENTS 5,271,300 A 12/1993 Zurbuchen et al.
5,394,773 A 3/1995 Zurbuchen et al.
(Continued)

FOREIGN PATENT DOCUMENTS

EP 1 736 674 A1 12/2006

OTHER PUBLICATIONS

French Preliminary Search Report dated Jun. 16, 2015 in French Application 14 60250, filed on Oct. 24, 2014 (with English Translation of Categories of Cited Documents).

*Primary Examiner* — Moshe Wilensky
(74) *Attorney, Agent, or Firm* — Oblon, McClelland, Maier & Neustadt, L.L.P.

(57) ABSTRACT

Provided is a method of fabricating a force transfer part including at least one lug made of composite material that is to receive a pin for making a pivot connection with another part. The method includes making a fiber preform for a main body of the part and making a preform for a reinforcing ring out of discontinuous long fibers, making the reinforcing ring preform to match the dimensions of at least one bore in the preform of the main body, inserting the reinforcing ring preform in the bore of the preform of the main body, and polymerizing the reinforcing ring and main body preforms in injection tooling. A force transfer part obtained by such a method is also provided.

10 Claims, 1 Drawing Sheet

(51) Int. Cl.
*F16H 21/10* (2006.01)
*B29C 70/48* (2006.01)
*B29C 70/86* (2006.01)
*B29C 70/08* (2006.01)
*F16C 7/02* (2006.01)
*B29K 63/00* (2006.01)
*B29K 105/12* (2006.01)
*B29K 307/04* (2006.01)
*B29K 309/08* (2006.01)
*B29L 31/30* (2006.01)
*B29L 31/06* (2006.01)
*F16C 9/04* (2006.01)
*F16C 11/04* (2006.01)

(52) U.S. Cl.
CPC .. *B29K 2309/08* (2013.01); *B29K 2995/0089* (2013.01); *B29L 2031/06* (2013.01); *B29L 2031/3076* (2013.01); *F16C 9/04* (2013.01); *F16C 11/04* (2013.01); *F16C 2326/43* (2013.01)

(56) References Cited

U.S. PATENT DOCUMENTS

| | | |
|---|---|---|
| 5,448,932 A | 9/1995 | Zurbuchen et al. |
| 2007/0007386 A1 | 1/2007 | Coupe et al. |
| 2010/0144227 A1 | 6/2010 | Coupe et al. |

METHOD OF FABRICATING A FORCE TRANSFER PART HAVING A LUG MADE OF COMPOSITE MATERIAL, AND A PART OBTAINED BY SUCH A METHOD

BACKGROUND OF THE INVENTION

The present invention relates to the general field of making force transfer parts that are to be stressed in traction and in compression, which parts include a lug at at least one of their ends that is made of composite material and that is to receive a pin for providing a pivot connection with another part.

A non-limiting example of an application of the invention is that of making landing gear side-braces.

A landing gear side-brace serves to take up lateral forces exerted on the landing gear and to keep it in a deployed position after making contact with the ground. Typically, a side-brace comprises two arms that are hinged to each other and to the other parts of the landing gear at their ends, via pivot connections.

Such force transfer parts are subjected to large mechanical forces in operation, which forces are mainly in compression and in traction, and are oriented along the longitudinal axis of the part (i.e. the axis passing via the two ends of the part).

When such force transfer parts are made of composite material, they are exposed more particularly to several modes of failure, including crushing. In the event of high loading, the pin of the pivot connection generally tends to bend, thereby causing stress to be concentrated at the edges of the bore in the lug through which the pin passes, and such stress concentrations are particularly harmful for the composite material. Such local stress concentrations lead to transverse shear in the composite material, thereby initiating damage by delamination of the material, which can lead to it breaking.

The ability to withstand crushing in such force transfer parts thus becomes a feature that is particularly important in determining their dimensions, thereby limiting the possibilities of using composite materials for making such parts.

OBJECT AND SUMMARY OF THE INVENTION

A main object of the present invention is thus to mitigate such drawbacks by proposing a force transfer part having at least one lug made of composite material and that presents improved ability to withstand crushing.

In accordance with the invention, this object is achieved by a method of fabricating a force transfer part including at least one lug made of composite material that is to receive a pin for making a pivot connection with another part, the method comprising the following steps: making a fiber preform for a main body of the part and making a preform for a reinforcing ring out of discontinuous long fibers; making the reinforcing ring preform to match the dimensions of at least one bore in the preform of the main body; inserting the reinforcing ring preform in the bore of the preform of the main body; and polymerizing the reinforcing ring and main body preforms in injection tooling.

A reinforcing ring made of discontinuous long fibers inserted in the bore in the force transfer part is caused to work in a direction that lies outside its plane (i.e. outside the warp-weft plane). The force transfer part thus benefits from local flexibility enabling it to absorb bending of the pivot connection pin that passes through the reinforcing ring, thereby considerably improving its ability to withstand crushing.

Furthermore, having recourse to discontinuous long fibers for making the reinforcing ring makes it possible to obtain interpenetration between the chips of the reinforcing ring and the fibers of the composite material lug. This interpenetration gives rise to a smooth transition zone between the lug and the reinforcing ring so as to limit the difference in stiffness at the interface. Thus, any risk of the reinforcing ring separating from its bore while the part is being subjected to traction or compression can be limited.

The reinforcing ring preform is preferably made from discontinuous long fibers of carbon or glass that are pre-impregnated with a thermosetting resin. Under such circumstances, the thermosetting resin may be selected from at least the following resins: epoxy type resins, cyanate-ester type resins, and polybismaleimide (BMI) resins.

The reinforcing ring preform is advantageously made by winding a mat of discontinuous long fibers around a mandrel. Such winding thus serves to optimize the properties of the material, both in the bore and at the interface with the preform of the main body.

Alternatively, the reinforcing ring preform may be made by using a "cookie-cutter" punch to cut a ring out from a preform made of discontinuous long fibers.

As for the main body preform, it may be made from a fiber blank obtained by: three-dimensional weaving, multilayer weaving of continuous fiber yarns, stacking plies of continuous fibers that are dry or pre-impregnated, shaping discontinuous long fibers that are pre-impregnated.

Advantageously, the step of polymerizing the reinforcing ring and main body preforms comprises compacting said preforms in injection tooling, the compacting of the reinforcing ring preform being obtained by using an expandable mandrel that is received inside the reinforcing ring preform. Having recourse to an expandable mandrel (or bladder) serves to improve the interpenetration of the chips of the reinforcing ring among the fibers of the lug made of composite material by changing the direction in which the chips point.

The bore may be cut out in the preform of the main body by using a "cookie-cutter" punch, by ultrasound, by water jet, by laser, or by hand.

The invention also provides a force transfer part including at least one lug of composite material that is to receive a pin for making a pivot connection with another part, the force transfer part comprising: a main body of composite material made from a fiber preform, said main body being provided with at least one bore; and a reinforcing ring made of composite material that is inserted in the bore in the main body, said reinforcing ring comprising discontinuous long fiber reinforcement densified by a matrix, chips of the reinforcing ring interpenetrating among fibers of the fiber preform of the main body.

The mechanical part may constitute a lever of a side-brace for landing gear.

BRIEF DESCRIPTION OF THE DRAWING

Other characteristics and advantages of the present invention appear from the following description made with reference to the accompanying drawing, which show an embodiment having no limiting character. In the figures.

DETAILED DESCRIPTION OF THE INVENTION

The invention applies to making any force transfer part that has a lug at at least one of its longitudinal ends, which lug is made of composite material and serves to receive a pin for making a pivot connection with another part.

Figure 1:
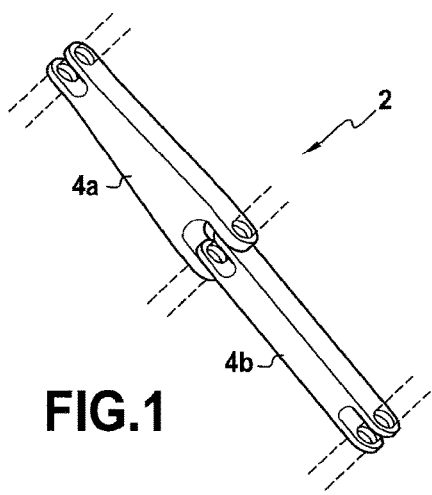
FIG. 1 is a diagrammatic perspective view of an example of a landing gear side-brace.

A non-limiting example of an application is that of making an aircraft landing gear side-brace, such as that shown in FIG. 1.

Typically, such a side-brace 2 serves to take up lateral forces exerted on the landing gear and to hold it in the deployed position, and it comprises a top lever 4a and a bottom lever 4b, each of which is in the form of an elongate mechanical part. These levers 4a and 4b are hinged together and they are also hinged to other parts of the landing gear via their respective ends, by means of hinge pins represented by dashed lines in FIG. 1.

Figure 2:
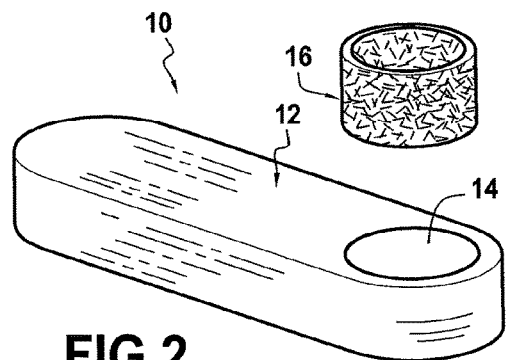
FIG. 2 is an exploded view of a fiber preform for making a force transfer part of the invention.

FIG. 2 shows an example of a fiber preform 10 that, after injection of a matrix, is to form a force transfer part 100 (see FIG. 4) of the invention suitable for acting by way of example, as a landing gear side-brace.

The preform 10 of the force transfer part of the invention comprises a main body preform 12 of elongate shape that is provided with a bore 14 at at least one of its longitudinal ends, together with a reinforcing ring preform 16 that is to be inserted in the bore 14 of the main body preform 12 so as to form a lug suitable for receiving a pin that is to provide a pivot connection with another part.

The main body preform 12 is made from a fiber blank obtained by any known method, such as three-dimensional weaving, multilayer weaving with continuous fiber yarns, stacking plies of continuous fibers that may be dry or pre-impregnated, shaping discontinuous long fibers that are pre-impregnated, etc.

The continuous fibers constituting the fiber blank may for example be refractory fibers, e.g. fibers made of ceramic, e.g. of silicon carbide (SiC), carbon fibers, or indeed fibers made of a refractory oxide, e.g. of alumina ($Al_2O_3$).

Once the fiber blank has been made, it is shaped so as to obtain the preform 12 shown in FIG. 2. A bore 14 is then made through the main body preform 12 to have the dimensions of the reinforcing ring preform 16, which operation may be performed by any known method of cutting a fiber preform, such as in particular by means of a "cookie cutter" punch, by ultrasound, by water jet, by laser, or by hand.

The reinforcing ring preform 16 is obtained by pre-compacting discontinuous long fibers that are pre-impregnated with a thermosetting resin. The discontinuous long fibers are fiber "chips" presenting lengths lying in the range 8 millimeters (mm) to 100 mm.

The fibers may be made of one of the following materials: glass, carbon, metal, and ceramic. The fibers may be formed by extrusion or by micro-pultrusion of a filament that is cut into segments of substantially equal length or of random lengths. For carbon or ceramic fibers, it is possible to use a carbon or ceramic precursor polymer (start of fiber die) that is deposited on a strip in the long direction of the fibers that are to be obtained and subjected to heat treatment in known manner in order to obtain carbon or ceramic fibers. For metal or glass fibers, they may be cut from a block of material. For appropriate fiber materials, they may also be formed by stamping, or by compressing a unidirectional sheet, or by electroforming on a shaper punch.

By way of example, it is possible to select discontinuous long fibers made of carbon or glass that are pre-impregnated with an epoxy resin fabricated by the supplier Hexcel under the name HexMC® or by the supplier Quantum under the name Lytex®.

The discontinuous long fibers may be pre-impregnated with the thermosetting resin in individual manner, i.e. while they are being made, or collectively by impregnating a determined quantity of dry fibers with the thermosetting resin.

Once pre-impregnated, the discontinuous long fibers are agglomerated in the form of a mat, which is wound around a mandrel in order to obtain a shape that corresponds to the final shape of the reinforcing ring that is to be made. Such winding thus makes it possible to optimize the properties of the material both at the bore, and at the interface with the main body preform.

Alternatively, the reinforcing ring preform may be obtained by using a water jet, manual cutting, or using a "cookie-cutter" punch to cut it out from a thick preform made using a mat of pre-impregnated discontinuous long fibers.

The fibers that have been pre-compacted into shape are then subjected to pre-curing treatment, i.e. to heat treatment of the thermosetting resin serving to impart cohesion to the resulting preform by causing the resin to creep naturally by capillarity. This pre-curing is obtained by heating the resin to a temperature that serves to initiate polymerization of the resin, and for a duration that enables the discontinuous long fibers to be maintained in their compacted state.

Figure 3:
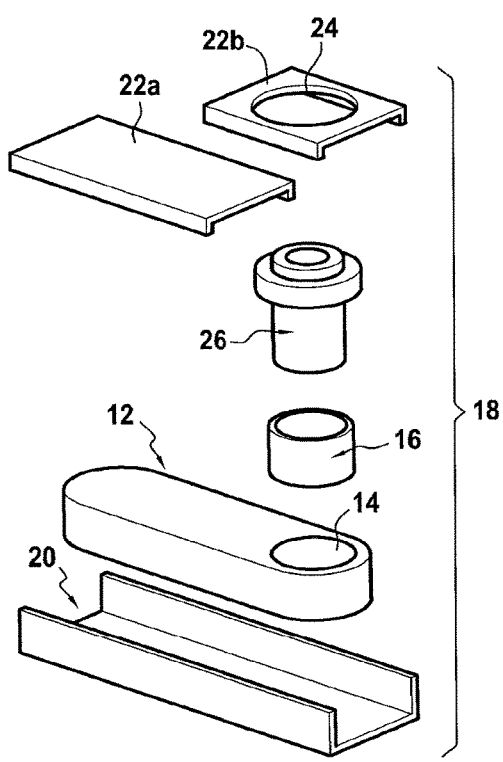
FIG. 3 is an exploded view of injection tooling for making a force transfer part of the invention.

The reinforcing ring preform 16 is then inserted in the bore 14 made in the main body preform 12, and the two preforms are polymerized. For this purpose, and as shown in FIG. 3, the main body preform 12 and the reinforcing ring preform 16 are placed in injection tooling 18 made up in particular of a mold 20 of shape complementary to the shape of the part that is to be fabricated, and of a mold cover made up of two portions 22a, 22b, one of which has a window 24 for passing an expandable mandrel 26 (or an inflatable bladder) that is received inside the reinforcing ring preform.

Once the expandable mandrel 26 is in position and the injection tooling 18 closed, the preforms 12 and 16 are subjected to compacting in the tooling, and resin is injected therein. It is possible to select a thermosetting resin, e.g. an epoxy type resin compatible with pre-impregnated applications, such as the products known as Hexcel M21, Hexcel 8552, Hexcel M42, Cytec Cycom 977-B, Hexcel M77, a cyanate-ester type resin, or a polybismaleimide (BMI) resin.

Polymerizing the preforms inside injection tooling 18 consists in initiating a cross-linking cycle that causes the injected resin to harden (and also causes the resin of the reinforcing ring preform 16 to harden) so as to form the composite matrix of the force transfer part. The (temperature and duration) parameters of this heat treatment naturally depend on the resin used.

Figure 4:
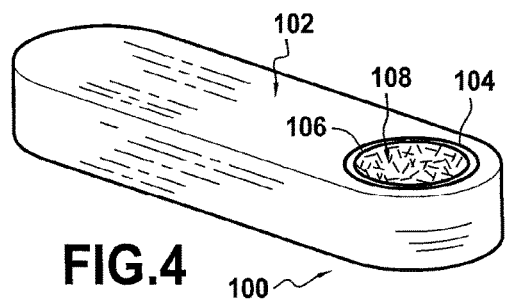
FIG. 4 is a perspective view of a force transfer part of the invention.

After unmolding and machining to final dimensions, a force transfer part 100 is obtained, as shown in FIG. 4, which part comprises a main body 102 made of composite material having a bore 104, with a reinforcing ring 106 made of composite material that is inserted in the bore 104 of the main body, said reinforcing ring comprising reinforcement made of discontinuous long fibers (DLF) densified by a matrix. The reinforcing ring 106 thus forms a lug 108 of composite material that is designed to receive a pin for providing a pivot connection with another part.

Figure 5:
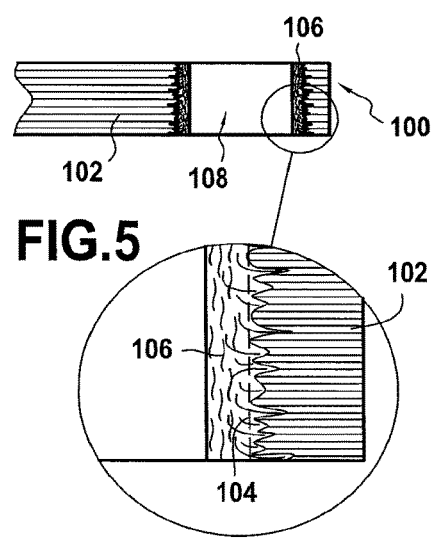
FIG. 5 is a section view of the FIG. 4 force transfer part.

FIG. 5 is a section view in the thickness direction through the lug 108 of the force transfer part 100 of FIG. 4. In this figure, it can be seen that the chips of the reinforcing ring 106 interpenetrate among the fibers of the lug of the main body 102 of the part. This interpenetration is obtained by having recourse to the expandable mandrel 26 (FIG. 3) during the stage of polymerizing the preform. It serves to create a smooth transition zone between the lug and the reinforcing ring so as to limit the stiffness difference at the interface. Thus, any risk of the reinforcing ring separating from its bore while the part is subjected to stress in traction or in compression can be prevented.

The invention claimed is:

1. A method of fabricating a force transfer part including at least one lug made of composite material that is to receive a pin for making a pivot connection with another part, the method comprising the following steps:
    making a fiber preform for a main body of the part and making a preform for a reinforcing ring out of discontinuous long fibers;
    making the reinforcing ring preform to match the dimensions of at least one bore in the preform of the main body;
    inserting the reinforcing ring preform in the bore of the preform of the main body;
    polymerizing the reinforcing ring and main body preforms in injection tooling; and
    resin injecting the reinforcing ring preform and the main body preform in the injection tooling.

2. A method according to claim 1, wherein the reinforcing ring preform is made from discontinuous long fibers of carbon or glass that are pre-impregnated with a thermosetting resin.

3. A method according to claim 2, wherein the thermosetting resin is selected from at least the following resins: epoxy type resins, cyanate-ester type resins, and polybismaleimide (BMI) resins.

4. A method according to claim 1, wherein the reinforcing ring preform is made by winding a mat of discontinuous long fibers around a mandrel.

5. A method according to claim 1, wherein the reinforcing ring preform is made by using a "cookie-cutter" punch to cut a ring out from a preform made of discontinuous long fibers.

6. A method according to claim 1, wherein the main body preform is made from a fiber blank obtained by: three-dimensional weaving, multilayer weaving of continuous fiber yarns, stacking plies of continuous fibers that are dry or pre-impregnated, shaping discontinuous long fibers that are pre-impregnated.

7. A method according to claim 1, wherein the step of polymerizing the reinforcing ring and main body preforms comprises compacting said preforms in injection tooling, the compacting of the reinforcing ring preform being obtained by using an expandable mandrel that is received inside the reinforcing ring preform.

8. A method according to claim 1, wherein the bore is cut out in the preform of the main body by using a "cookie-cutter" punch, by ultrasound, by water jet, by laser, or by hand.

9. A method according to claim 7, wherein the expandable mandrel is an inflatable bladder.

10. A method according to claim 7, wherein the injection tooling includes a mold of shape complementary to a shape of the force transfer part, and a mold cover including first and second portions, the second portion of the mold cover including a window through which passes the expandable mandrel that is received inside the reinforcing ring preform.

* * * * *